United States Patent Office 2,768,284
Patented Oct. 23, 1956

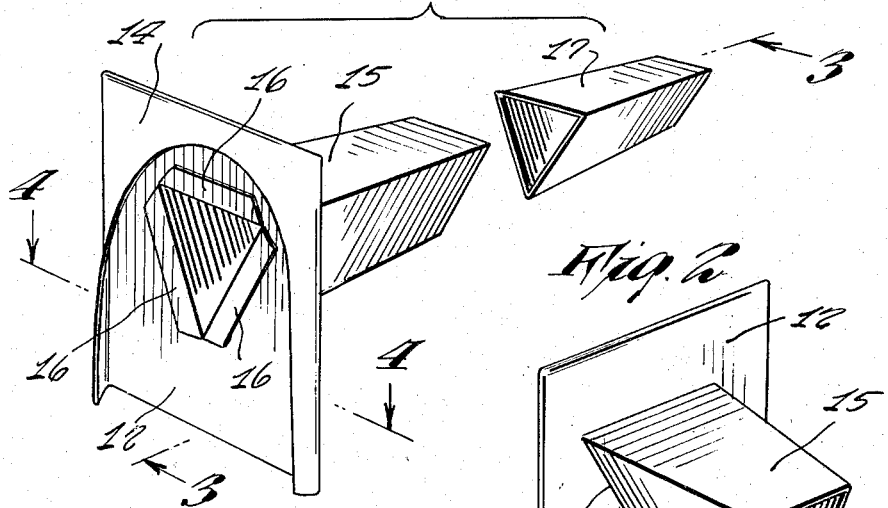
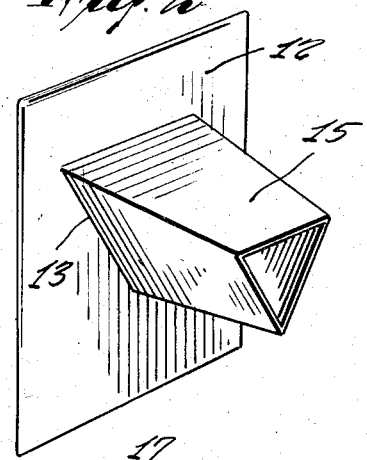
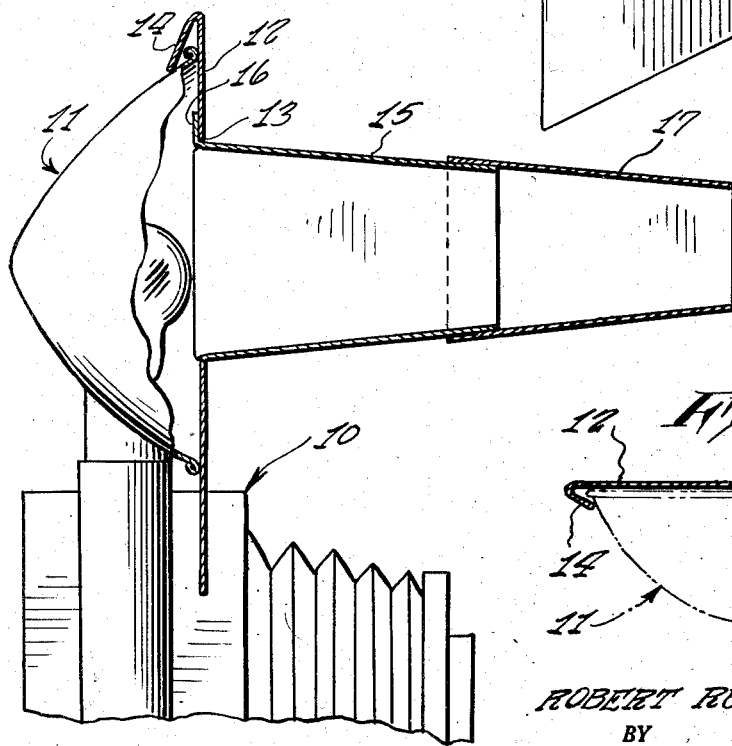
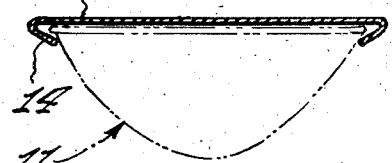

2,768,284

MASK ATTACHMENT FOR PHOTOGRAPHIC LAMPS

Robert Russe Woolley, Cleveland, Ohio

Application October 15, 1953, Serial No. 386,181

1 Claim. (Cl. 240—46.53)

This invention relates to attachments for photographic flash units.

It is an object of the present invention to provide an attachment for photographic flash units which allows for many special effects by the placing of the light on the subject and withholding the same from surrounding areas, the attachment being adapted to be fitted easily and quickly over the head of a flash unit.

Another object of the present invention is to provide an attachment for photographic flash units, which will control the direction, placement, pattern and spillage of light emitted from the flash unit, the invention allowing the operator to concentrate the light from the flash unit on the subject, while withholding light from surrounding areas.

Other objects of the present invention are to provide an attachment for photographic flash units which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is an exploded perspective view of the parts comprising the invention;

Fig. 2 is a front perspective view of the principal part of the invention;

Fig. 3 is a longitudinal sectional view taken along the line 3—3 of Fig. 1, the device being shown in operative position on a flash bulb unit of a camera; and Fig. 4 is a transverse sectional view taken along the line 4—4 of Fig. 1.

Referring now to the drawings, there is shown a conventional camera 10 having a photographic flash unit 11 mounted thereon. In the practice of my invention, a flat rectangular plate 12 is provided with a central V-shaped opening 13. A semi-circular hood 14 is integrally formed along the top and side edges of plate 12 and is adapted to permit the latter to be readily and easily mounted across the face of the flash unit 11. A snood or tube 15 of substantially V-shaped cross section is provided, the snood 15 tapering from one end to the other (Fig. 3). The larger end of the snood 15 is integrally formed with flaps 16 by means of which it is secured to the plate 12 by means of welding or the like (Fig. 1). An extension snood or tube 17 is provided, tapering from one end to the other and of substantially V-shaped cross section, the larger end of snood 17 being adapted to slide onto the smaller end of snood 15 (Fig. 3), whereby to decrease the opening of the device. It will be noted that the plate 12 is mounted upon the flash unit 11 by means of a wedge friction action. The plate 12, hood 14, and snoods 15 and 17 may be stamped from light weight metal (aluminum alloy) whereupon they may be folded, seamed and joined to make a complete single item.

It will be apparent that the attachment may be fitted quickly over the head of the unit 11, controlling the direction, placement, pattern and spillage of light emitted from the flash unit. The invention allows the operator to concentrate the light from the flash unit on the subject, while withholding light from surrounding areas. A photographer may employ the present invention quickly and easily to obtain varied lighting effects (spotlight effects). The device, it will be noted, may be received and revolved around the head of the flash unit 11 for further control of light. With the present invention, the resulting light pattern is feathered and falls off in a brief but graduated manner, therefore eliminating the necessity for a variety of shapes of the snoods.

It should be understood, that in actual practice of my device, the same may be employed with one or more extension flash units. This is common practice, to gain side lighting, back lighting, or background spot lighting or the like. Therefore, the flash unit and attached snood may or may not be mounted on the camera, although the on-the-camera position will, no doubt, represent the most common usage.

While various changes may be made in the detail construction, it shall be understood that such changes shall be within the spirit and scope of the present invention as defined by the appended claim.

Having thus set forth and disclosed the nature of my invention, what is claimed is:

A snood attachment for flash units comprising, in combination, a flat plate adapted to fit across the face of the flash unit in front of a flash bulb therein, a semi-circular hood connected to the top and sides of said plate adapted to removably engage the flash unit in a wedge friction action, a centrally disposed substantially V-shaped opening in said plate, a substantially V-shaped first tube mounted within said opening and tapering in size from an enlarged inner extremity adjacent to said plate to a reduced outer extremity of substantially the same cross-sectional configuration, said inner extremity of said tube having a flap extension on each surface and being bent laterally into securing engagement with the inner surface of said plate for preventing disengagement of said tube outwardly of said plate, and an auxiliary tube of substantially the same configuration as said first tube and being open both ends, the inner enlarged end of said auxiliary tube fitting the outer end of said first tube in wedge friction action.

References Cited in the file of this patent

UNITED STATES PATENTS

| | | |
|---|---|---|
| 1,167,078 | Jones | Jan. 4, 1916 |
| 1,811,988 | Whittemore | June 30, 1931 |
| 2,361,016 | Fetterman | Oct. 24, 1944 |
| 2,385,770 | Birch-Field | Oct. 2, 1945 |
| 2,489,172 | Brandt | Nov. 22, 1949 |
| 2,518,505 | Teele | Aug. 15, 1950 |
| 2,550,594 | Petrakakis | Apr. 24, 1951 |
| 2,713,114 | Boyd | July 12, 1955 |